US012609741B2

(12) United States Patent

Paidimarri et al.

(10) Patent No.: US 12,609,741 B2

(45) Date of Patent: Apr. 21, 2026

(54) CONFIGURABLE BEAMFORMER INTEGRATED CIRCUIT CONTROL

(71) Applicant: INTERNATIONAL BUSINESS MACHINES CORPORATION, Armonk, NY (US)

(72) Inventors: Arun Paidimarri, South Salem, NY (US); Bodhisatwa Sadhu, Peekskill, NY (US); Mark Yeck, Bloomingdale, NJ (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 18/222,588

(22) Filed: Jul. 17, 2023

(65) Prior Publication Data

US 2025/0030466 A1 Jan. 23, 2025

(51) Int. Cl.
H04B 7/06 (2006.01)

(52) U.S. Cl.
CPC .................................. H04B 7/0617 (2013.01)

(58) Field of Classification Search
CPC .... H04B 7/0617; H04B 7/086; H04B 7/0408; H04B 17/12; H04B 1/401; H04B 1/48; H04B 7/0671; H04B 17/21; H04B 7/10; H04B 1/0458; H04B 1/44; H04B 2001/0425; H04B 1/0475; H04B 1/0483; H04B 1/18; H04B 1/40; H04B 7/043; H01Q 3/36; H01Q 21/0025; H01Q 3/28; H01Q 3/38; H01Q 21/22; H01Q 3/267; H01Q 21/065; H01Q 3/26; H01Q 3/2605; H01Q 3/24; H01Q 21/061; H01Q 3/34; H01Q 3/40; H01Q 1/246; H01Q 21/24; H03F 2200/451; H03F 3/195; H03F 3/19; H03F 3/45085; H03F 3/245; H03F 2200/387; H03F 2200/294; H03F 2200/09; H03F 2200/129; H03F 2200/144; H03F 2200/27; H03F 2203/45116; H03F 2203/45151

See application file for complete search history.

(56) References Cited

U.S. PATENT DOCUMENTS

| | | | |
|---|---|---|---|
| 5,339,086 A | 8/1994 | DeLuca et al. | |
| 8,618,983 B2 | 12/2013 | Chen et al. | |
| 9,160,433 B2 | 10/2015 | Liu et al. | |
| 11,005,581 B1 | 5/2021 | Gomadam et al. | |
| 11,081,792 B2 | 8/2021 | Jain et al. | |
| 11,171,418 B2 * | 11/2021 | Zihir ........................ | H01Q 3/26 |

(Continued)

OTHER PUBLICATIONS

Valdes-Garcia et al., "A Fully Integrated 16-Element Phased-Array Transmitter in SiGe BiCMOS for 60-GHZ Communications," IEEE Journal of Solid-State Circuits, vol. 45, No. 12, Dec. 2010, 17 pages.

(Continued)

*Primary Examiner* — Golam Sorowar

(74) *Attorney, Agent, or Firm* — L. Jeffrey Kelly

(57) ABSTRACT

A beamformer circuit comprises a front end subcircuit. The front-end subcircuit comprises a phase control structure and a gain control structure. The beamformer circuit also comprises a first area in memory that is dedicated to storing settings for the phase control structure. The beamformer circuit also comprises a second area in memory that is dedicated to storing settings for the gain control structure.

14 Claims, 6 Drawing Sheets

(56) References Cited

U.S. PATENT DOCUMENTS

| | | | |
|---|---|---|---|
| 11,404,779 | B2 | 8/2022 | Mobarak et al. |
| 2017/0187109 | A1 | 6/2017 | Wang et al. |
| 2018/0062274 | A1* | 3/2018 | Madsen .................. H01Q 3/24 |
| 2018/0234121 | A1* | 8/2018 | Corman .................. G06F 3/061 |
| 2019/0273524 | A1* | 9/2019 | Rainov .................. H04B 1/16 |
| 2020/0295456 | A1* | 9/2020 | Mobarak ............... H01Q 3/267 |
| 2023/0075523 | A1* | 3/2023 | Paidimarri ........... H04B 7/0671 |
| 2023/0350046 | A1* | 11/2023 | van den Broeke ..... G01S 13/02 |
| 2025/0192838 | A1* | 6/2025 | Nilsson ................. H04B 7/086 |

OTHER PUBLICATIONS

Hassanieh et al., "Fast Millimeter Wave Beam Alignment," ACM, SIGCOMM '18, Aug. 20-25, 2018, 14 pages.
Sadhu et al., "The More (Antennas), the Merrier," RWW Feature, IEEE, Microwave Magazine, Dec. 2019, 19 pages.
Valdes-Garcia et al., "A Fully-Integrated Dual-Polarization 16-Element W-band Phased-Array Transceiver in SiGe BiCMOS," IEEE Radio Frequency Integrated Circuits Symposium, 2013, 4 pages.
Sadhu et al., "A 28-GHz 32-Element TRX Phased-Array IC With Concurrent Dual-Polarized Operation and Orthogonal Phase and Gain Control for 5G Communications," IEEE Journal of Solid-State Circuits, vol. 52, No. 12, Dec. 2017, 19 pages.
Ahmadi, "5G NR: Architecture, Technology, Implementation, and Operation of 3GPP New Radio Standards," Elsevier, New Radio Access Physical Layer Aspects (Part 2), 2019, pp. 509-515.

* cited by examiner

Figure 1A:
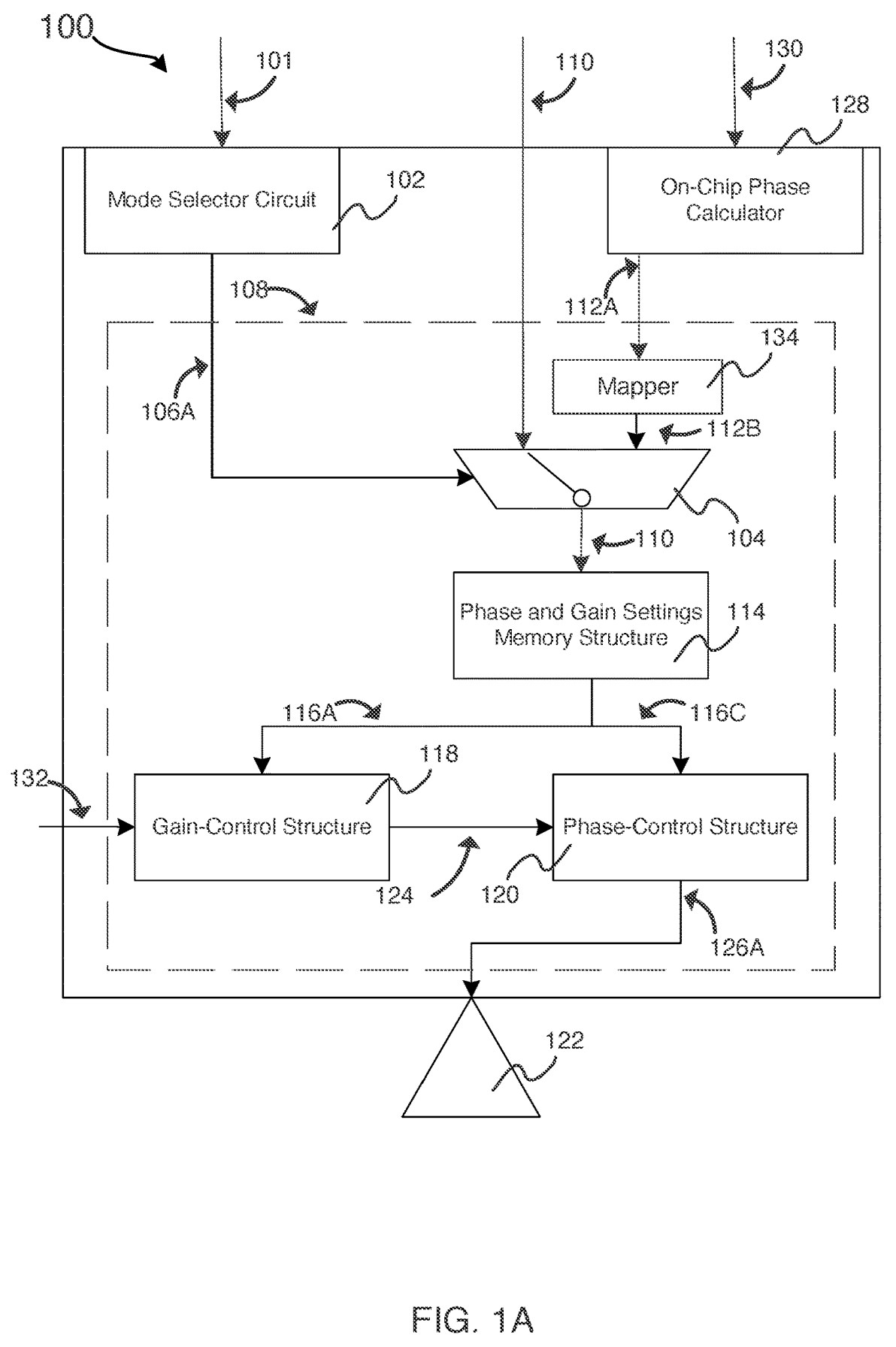

100

101

110

130

128

Mode Selector Circuit        102

On-Chip Phase Calculator

108

112A

106A

134

Mapper

112B

104

110

Phase and Gain Settings Memory Structure        114

116A

116C

118

132

Gain-Control Structure        Phase-Control Structure 124        120

Figure 1B:
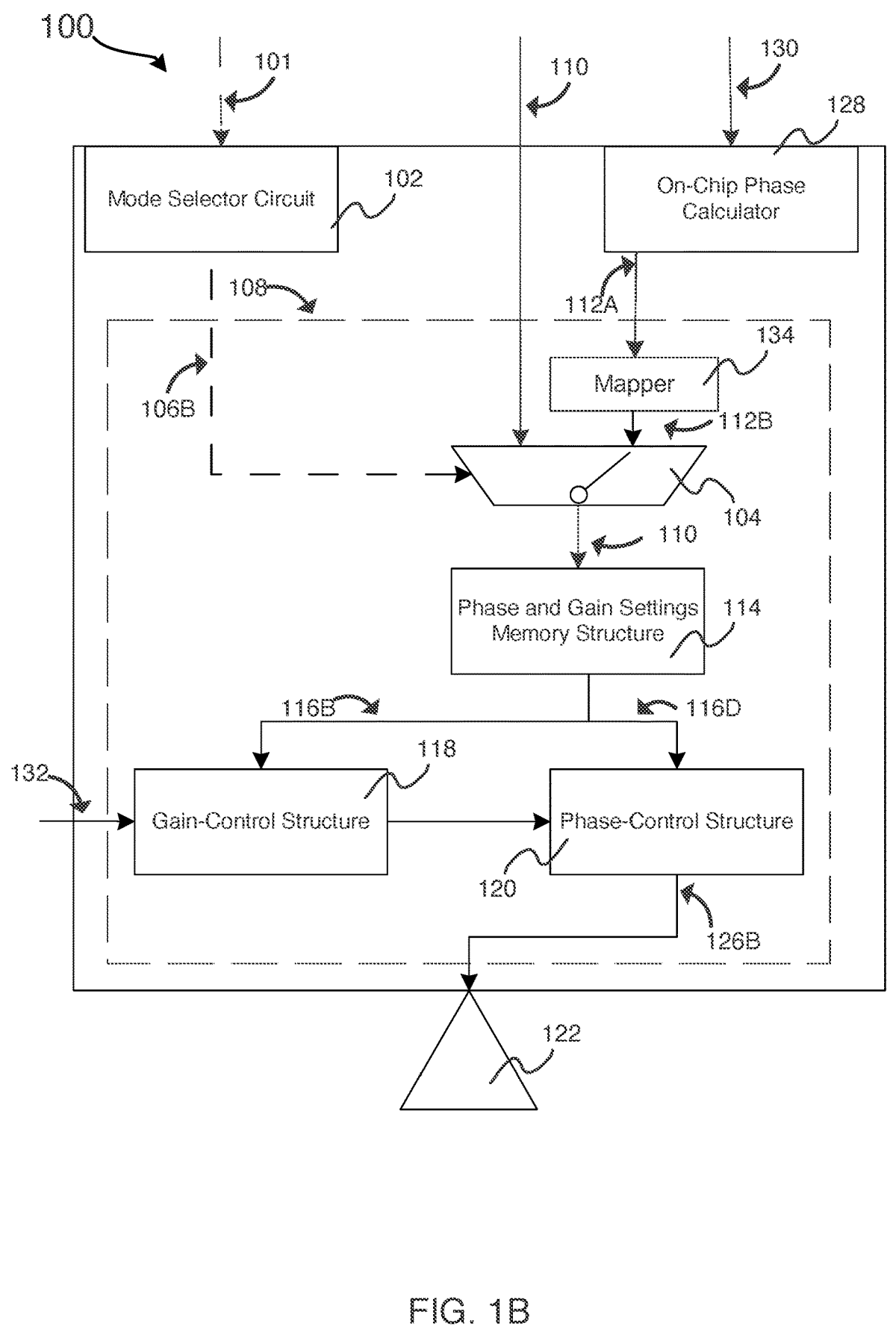

Mode Selector Circuit    102

On-Chip Phase Calculator

108

112A

106B

Mapper    134

112B

104

110

Phase and Gain Settings Memory Structure    114

116B

116D

132

118

Gain-Control Structure

Phase-Control Structure

CONFIGURABLE BEAMFORMER INTEGRATED CIRCUIT CONTROL

BACKGROUND

The present invention relates to antenna arrays, and more specifically, to beamformer circuits for antenna arrays.

Antenna arrays are composed of multiple antennas. The signals that are transmitted by or received by those antennas are often controlled separately to produce composite beams with desired properties. To control the signals of those antennas, antenna arrays often incorporate one or more beamformer integrated circuits. Typical beamformer circuits incorporate, for each antenna in the array, a front-end circuit (sometimes referred to as a subcircuit of the beamformer circuit). In most beamformer circuits, each of these front-end circuits individually controls the signals corresponding to a single antenna in the antenna array. This control typically involves changing the phase and/or the amplitude of the corresponding signal. Towards this end, the front-end circuit typically includes structures such as a phase shifter and a variable gain amplifier. Moreover, front-ends also typically include a memory structure that holds configuration settings, including settings for the phase shifter and variable gain amplifier.

Antenna arrays are sometimes used in situations that require them to transmit (or be configured to receive) a beam of an arbitrary shape. This may occur, for example, when the array produces a wide-shaped beam for initial alignment (e.g., transmission direction toward an intended recipient, reception from an intended transmitter when the precise location is not known). Another example of a beam with a unique or arbitrary shape is one that has multiple nulls at specific locations where undesired interferers are present. Antenna arrays are also sometimes used in situations that require them to transmit beams in a precise direction. This may occur, for example, when the array produces a beam with a narrow shape in a very specific direction to transmit towards an intended recipient with maximum gain. In an example, in order to form a narrow beam in a specific direction, the supporting beam former circuit is typically configured to apply a linear gradient to the phase settings of the front-ends that are coupled to adjacent antennas. In an example, it is also possible to point this linear-phase-gradient beam slightly away from the direction of maximum gain such that any interferers are minimized by, for example, using the nulls.

The speed of reconfiguration between beams, also known as beam switching speed, is an important metric for beam formers. A key determining factor for this speed is the amount of information that needs to be communicated from an external controller (for example a baseband chip, or a control FPGA). In both communication and sensing applications reducing the beam switching time as much as possible is important to improve system throughput. This is because the overall system that uses the beamformer cannot exercise its intended functionality (e.g. to send or receive a desired signal in a specific direction) while the output beam patter is in transition from one state to another. In general, switching between one beam shape and another requires modifying the phase and gain settings for each individual front end. As an example, by sequentially writing to individual registers that control the phase and gain settings in each front end, the external controller can cause the beamformer to switch to any new beam shape. However, the total amount of information communicated is large, and grows with the number of antennas in the system. Thus, the number of clock cycles required for this may be too large for a given application. It is thus critical for a beam former to have the means to switch between beams with a small amount of information which translates to a small number of clock cycles of communication from the external controller to the beamformer. A related and also important performance criterion is the total amount of possible beam configurations among which the beam former can switch in a fast manner (e.g. by avoiding updating each individual control register sequentially from the external controller).

For this reason, beamformer circuits employ specialized circuits to speed up the process of switching beam shapes. One typical approach is to employ memory units known as "beam tables." In this approach, each front-end is associated with a memory in which each row contains phase shifter and variable gain amplifier settings that correspond to a given beam shape. The memories are first configured by the external controller in a one-time, set-up operation. Once configured, switching among these pre-stored beam settings can be fast as only an index into the memories needs to be communicated by the external controller. In these beam table approaches, any beam shape is supported, for example broad beams, linear phase gradient beams with and without tapering and arbitrary beams.

Ideally, it is desirable to have access to completely arbitrary beams where the gain and phase applied to each antenna is tuned precisely for achieving the most optimal spatial filter/beam pattern at any given time. As explained above, beam table approaches can implement these arbitrary beam patterns while doing it fast because only an index into the beam table needs to be broadcast to all the front ends. However, this requires dedicated memory per beam per front-end and thus has scaling limitations for large beam counts. An alternate approach is to include an on-chip calculator that computes the phase and gain values required for some classes of beam shapes, for example linear phase gradient beams. These calculators have the advantage of maintaining fast beam switching because only a few beam parameters need to be broadcast to all the front ends. With a given implemented calculator, the number of unique beams supported can be very large without corresponding increases in memory or circuit area. However, the limitation is that only the specific beam types implemented in the calculator are supported. On-chip calculators that compute linear-phase gradient beams can be area efficient. Linear-phase gradient beams are some of the most widely used beam types and cover a wide variety of use cases. However, linear phase gradient calculators are presented in this description only as an example; in practice other on-chip calculators could also be used. While an on-chip calculator provides access to a large number of beams, it is still desirable to have access to completely arbitrary beams too, so that the best beam for a given use case can still be employed.

SUMMARY

Some embodiments of the present disclosure can be illustrated as a beamformer circuit comprising a front-end subcircuit. The front-end subcircuit comprises a phase control structure and a gain control structure. The front-end subcircuit also comprises a first area in memory that is dedicated to storing settings for the phase control structure, and a second area in memory that is dedicated to storing settings for the gain control structure.

Some embodiments of the present disclosure can also be illustrated as a method of controlling a beamformer circuit. The method comprises sending, for an intended beam, a first call to a first area in memory, on a front-end subcircuit, that is dedicated to storing settings for a phase control structure on the front-end subcircuit. The method also comprises sending, for the intended beam, a second call to a second area in memory, on the front-end subcircuit, that is dedicated to storing settings for a gain control structure on the front-end subcircuit.

Some embodiments of the present disclosure can also be illustrated as a method of controlling a beamformer circuit. The method comprises sending, for an intended beam, a first call to a first area in memory, on a front-end subcircuit, that is dedicated to storing settings for a first control structure on the front-end subcircuit. The beamformer circuit also comprises a second area in memory that is dedicated to storing settings for a second control structure on the front-end subcircuit.

BRIEF DESCRIPTION OF THE DRAWINGS

FIG. 1A illustrates a first depiction of a configurable beamformer integrated circuit in an arbitrary beam shape mode.

FIG. 1B illustrates a second depiction of the configurable beamformer integrated circuit in a pre-determined beam shape mode.

DETAILED DESCRIPTION

Figure 2:
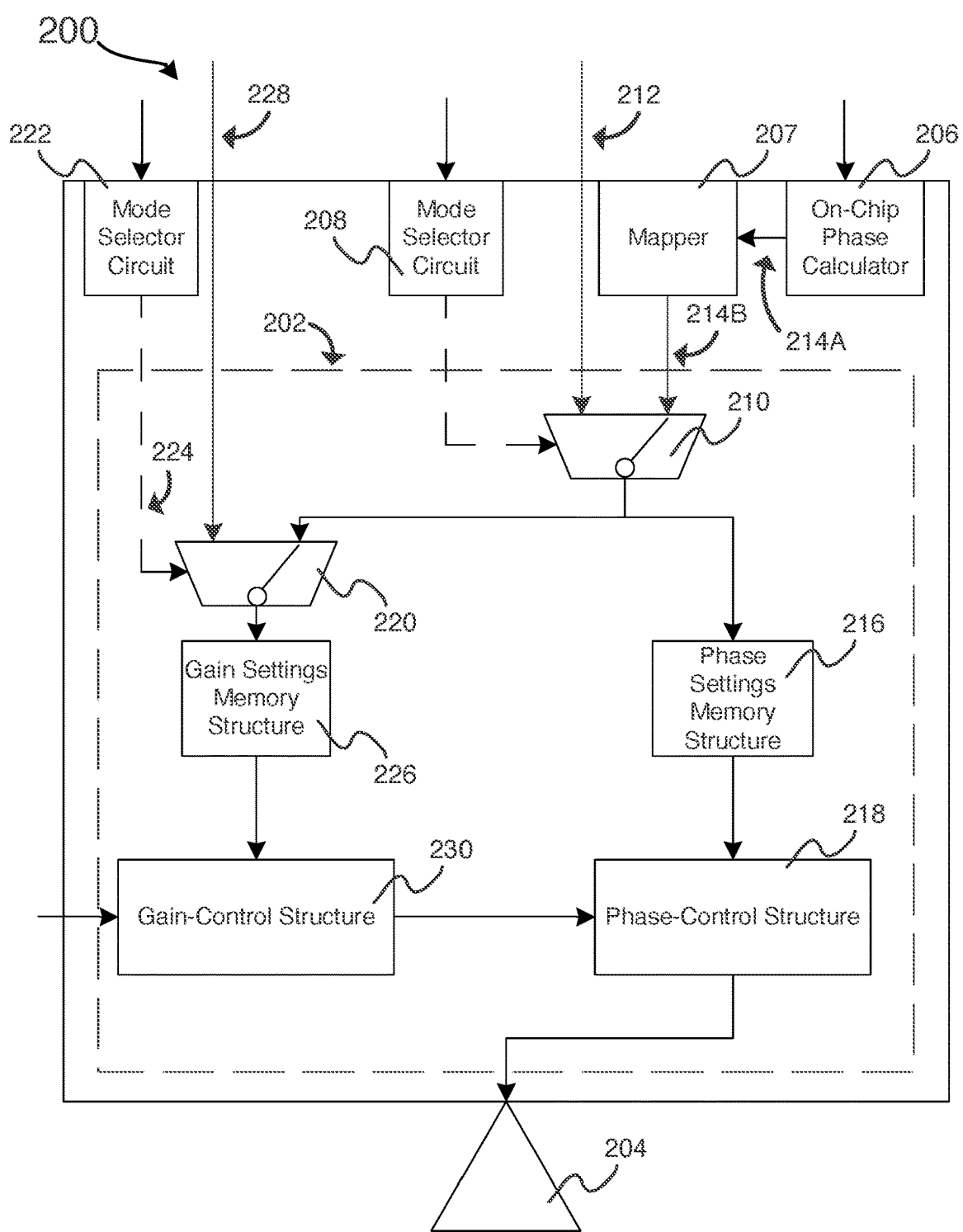
FIG. 2 illustrates a depiction of a configurable beamformer integrated circuit with independent phase and gain control memory units.

Antenna arrays that are designed to transmit and/or receive beams of various shapes and directions typically require corresponding integrated circuits to control the signals on each antenna in the array. Often phase-shift settings and gain settings that are unique for each antenna typically must be determined and communicated with the front ends in the beam former to cause the corresponding antennas, when combined together, to either transmit a beam in the desired shape, in the desired direction, and of the desired size or to be configured to receive a beam of the desired properties.

Typical antenna arrays utilize beamformer integrated circuits (sometimes referred to herein as "beamformer circuits," "beamforming circuits," or "beamformers") to control the signals transmitted by or received from each antenna in an array. A beamformer circuit often includes, for each antenna in the array, a front-end subcircuit. Front-end subcircuits often include a phase shifter structure and a variable gain amplifier that, together, control the phase and gain properties of the signals of the corresponding antenna. In some instances, these phase and gain effects can be produced by multiple circuit blocks. Front-end subcircuits also often include a memory structure, such as a dedicated circuit that implements memory to data (e.g., static random access memory also referred to as "SRAM") or series of flip-flops or registers configured as a memory, or other volatile/non-volatile memories, that contains phase and gain settings for the phase shifter structure and amplifier that correspond to desired beam parameters. Thus, once the parameters of a desired beam are identified, the corresponding phase and gain settings for that desired beam can be identified in the memory structure and applied to the phase shifter structure and amplifier. Of note, in some instances, changes in the settings of a phase shifter cause non-ideal gain variations. Similarly, changes in the settings of an amplifier can also cause non-ideal phase variations.

In typical use cases, a beamformer circuit is configured to receive a specific format of information about the desired beam and is configured to output the corresponding beam. For example, some use cases benefit from the ability of an antenna array to form beams of arbitrary shapes. This may be useful, for example, to generate very broad beams that can identify an ideal alignment of a final, narrower beam. This could also be useful for performing a search algorithm or for creating beams with a small number of specific nulls to avoid interference to or from these directions. Beamformer circuits for these use cases typically are designed to receive, as input, the locations in the memory structures on the beamformer circuit at which the correct phase and gain settings are located.

Specific phase and gain settings for a desired set of arbitrary beam shapes are calculated off of the beamformer circuit. These settings are then communicated to the beamformer and stored in on-chip memories also known as "beam tables." For this reason, these beamformer circuits are sometimes described as a beam-table design. Typically there is one such beam table per front end. Note that the input and storage of the set of phase and gain settings can be relatively slow (e.g. take a large number of clock cycles), but this is considered a one-time operation, typically executed as part of the start-up sequence of the beamformer. Then, during normal operation, when a specific beam from the set is required, the memory address for the corresponding settings is input into the beamformer circuit and forwarded to the "beam tables" in each front-end subcircuit. The phase shifter and variable gain amplifier settings change according to the values in the new memory address and the new beam is formed. In this approach, the operation of switching from one beam of the set to another one is reduced to a change in the effective beam table address. This can typically happen in a few clock cycles and hence fast beam switching is accomplished. Note that this fast beam switch operation is limited to the set of pre-programmed beams. The size of the set is limited by the size of the memory that can be integrated in the beamformer. Thus, these beamformer circuits are typically less suitable in use cases that require a large number of beams (for example, narrow beams in specific directions).

As an example, when arrays grow in size (i.e., in the number of antennas), they are able to produce narrower beams and achieve a larger operating range, or alternatively, consume less power while achieving the same range. As another example, narrower beams may help avoid interference due to the reduced width of the beam. Interference may also be minimized with the use of nulls in the beam pattern, for example by pointing the beam such that the nulls are in the direction of interferers. A large set of narrow beams may be produced with linear phase gradients. However, with a beam-table approach, the amount of beam table memory that is required per front-end to store the growing number of beams grows correspondingly. Additionally, since the number of antennas and front ends are also larger, the total time (i.e., clock cycles) required to rewrite a beam table entry also grows larger. Thus, from an application perspective, the beam-table approach does not scale.

Thus, beamformer circuits in use cases in which a large number of beam directions may be required often utilize different designs. For example, an on-chip-calculator beam-former designs can be configured to transmit and receive beams of a pre-determined shape in many more directions than beam-table beamformer designs. These on-chip-calculator beamformers utilize a phase calculator structure in the beamformer circuit (e.g., a subcircuit of the beamformer circuit). The phase calculator is configured to accept, as an input, an intended direction in which a beam of the antenna array is to be transmitted (or from which it is to be received). In some implementations, the beam shape may be a linear phase-slope beam, or a sinc-shaped beam. For this beam shape, an off-chip circuit (i.e., a circuit that is not integrated within the beamformer circuit) may calculate a set of linear phase slopes based on the intended direction. The linear phase slopes are, in these implementations, transmitted to the phase calculator on the beamformer circuit.

The phase calculator is then configured to calculate, for a pre-determined beam shape, the phase values for each antenna in the array that are necessary to produce a beam of that pre-determined shape that is propagated in that intended direction. These calculations can be based on the input intended direction (often in terms of a linear phase slope) and the location of the antenna in the array (which may be pre-configured via software/hardware for each front-end). Once the phase values are calculated, the beamformer circuit can map the phase values to the corresponding control settings for the phase shifter and the variable gain amplifier. This mapping may be performed in a memory structure on the beamformer circuit. The settings at that mapped memory location may cause the associated antenna to output the required signal that, combined with the signals of other antennas in the array, creates a beam of the desired shape and direction.

Some on-chip-calculator beamformer circuits also contain a front-end subcircuit for each antenna element that contains a phase shifter, an amplifier, and a memory structure that stores phase and gain settings for the shifter and amplifier. In these implementations, the ideal phase values that are calculated by the beamformer circuit's phase calculator can be sent to the memory structures for each of those front-end subcircuits. That ideal phase can be sent to the memory structures in the form of a memory address. In other implementations, different memory addresses may be calculated for each front-end subcircuit's memory structure. Based on those memory addresses, the phase and gain settings for each front-end subcircuits that realize the ideal phase value can then be output from the memory structures to the phase shifters and amplifiers.

Unfortunately, as discussed, typical on-chip calculators in beamformer circuits are configured to quickly calculate phase and gain values only for beams of a pre-determined shape. Thus, while beam-table beamformers can be used to create beams of arbitrary shapes, on-chip-calculator beam-formers can typically only be used to create beams of a single shape. Reconfiguration of the on-chip calculator for a different beam shape takes time. For this reason, on-chip-calculator beamformers can be useful in arrays that are able to transmit, for example, a narrow beam of pre-determined shape in many directions. This makes on-chip-calculator beamformers particularly suitable in situations in which the precise location of an intended receiver (or transmitter) device (sometimes referred to as the "intended device" or "target device") is known. On-chip-calculators are also particularly suitable in situations in which other devices are located near the target device and in which a beam shape that encompassed the locations of those other devices would result in unwanted interference.

Thus, as discussed, in some use cases for operating an antenna array, a beamformer circuit with a beam-table design is most suitable and a beamformer circuit with an on-chip-calculator design is particularly unsuitable. Similarly, in other scenarios for operating the antenna array, a beamformer circuit with a beam-table design is particularly unsuitable and a beamformer circuit with an on-chip-calculator design is particularly suitable. For this reason, typical beamformer circuits are often only best suited for some, but not all, scenarios of the deployment of the corresponding antenna arrays.

Some embodiments of the present disclosure address the above issues by incorporating a beamformer circuit that can be configured to support a beam with an arbitrary beam shape or a beam with a pre-determined beam shape. Based on the desired beam shape, the beamformer circuit can be placed into a respective beam mode.

For example, some embodiments of the present disclosure can be configured into an arbitrary-beam mode. In the arbitrary-beam mode, the beamformer circuit is configured to accept, as input, memory address information that was determined off the beamformer circuit chip. That memory address information may correspond to a desired beam shape and direction for the antenna array and the phase and gain settings for the antennas in the array that are necessary to result in that desired beam shape and direction. That memory-address information can then be forwarded to a set of memory structures in the front-end subcircuits of the beamformers.

As another example, some embodiments of the present disclosure can be configured into a pre-determined beam mode. In the pre-determined beam mode, the beamformer circuit is configured to accept, as input, beam parameters such as a desired direction of a beam of a pre-determined shape or the linear phase gradients to steer a beam in a specific direction. Those beam parameters can be input into an on-chip phase calculator that calculates, for each antenna in the array, the necessary phase-shift that are necessary for the array to transmit (or receive) a beam of the pre-determined shape and in the desired direction. These calculations can be based on the input intended direction (or for example, the linear phase slopes) and the location of the antenna in the array (which may be pre-configured via software/hardware for each front-end). Once the phase values are calculated, the beamformer circuit can map the phase values to the corresponding control settings for the phase shifter and the variable gain amplifier. This mapping may be performed in a memory structure on the beamformer circuit. The settings at that mapped memory location may cause the associated antenna to output the required signal that, combined with the signals of other antennas in the array, creates a beam of the desired shape and direction.

Some embodiments of the present disclosure may also include independent memory structures for phase-shift settings and gain settings in the front-end subcircuits of a beamformer circuit. These embodiments may advantageously significantly increase the precise beams that can be produced by the corresponding antenna array with the same number of total memory rows. As an example, the gain settings for a phased array may be used for applying tapering. For beams configured with a linear phase gradient, a tapering function such as a Taylor windowing function can apply specific gains to each front-end in order to reduce beam sidelobe levels below a desired level. This trades off peak beam power and the level of sidelobes. The tapering windowing function is independent of the beam direction, which is set by the phase shift settings. As another example, the gain settings for the phased array may be used to turn off some elements in order to create wider beams. Embodiments with independent memory structures for phase-shift settings and gain settings may also advantageously enable the independent, fast configuration of a beam with gain-only settings, for example to change tapering values while maintaining the beam direction.

For example, a front-end circuit with a single memory structure with 128 addressable rows may be capable of outputting 128 unique arbitrary-shape beams. This is because the settings for each unique beam may be coded by a single row that contains both the phase and gain settings for that beam. However, if that same front-end circuit contained two independently addressable memory structures that each contained 128 addressable rows, that front-end circuit could, in theory, combine each of the 128 different phase-shift settings in the phase settings memory structure with each of the 128 different gain settings in the gain settings memory structure. Thus, by dividing the 128 rows into two independent memory structures, the number of unique arbitrary-shaped beams could, theoretically, increase from 128 beams to 16,384 beams.

A similar example illustrates similar advantages when outputting beams of a pre-determined shape. A front-end circuit with a single memory structure with 128 addressable rows may be capable of outputting 16,384 unique beams of a pre-determined shape. However, if that same front-end circuit contained two independently addressable memory structures that each contained 128 addressable rows, that front-end circuit could, in theory, combine each of the 128 different phase-shift settings in the phase settings memory structure with each of the 128 different gain settings in the gain settings memory structure. Thus, by dividing the 128 rows into two independent memory structures, the number of unique pre-determined shaped beams could, theoretically, increase from 16,384 beams to 2,097,152 beams.

Moreover, the architecture enables fast switching of the gain settings independently from fast switching of the phase settings. This fast switching could take the form of, for example, changing the tapering for a given beam direction, or changing of aperture for a given direction, or changing of direction for a given aperture and tapering. It is of course possible to achieve fast switching of both phase and gain settings too.

Some example embodiments of the present disclosure are represented by a beamformer circuit that comprises a front-end subcircuit. The front-end subcircuit comprises a phase-control structure and a gain-control structure. The front-end subcircuit also comprises a first area in memory that is dedicated to storing settings for the phase control structure. The front-end subcircuit also comprises a second area in memory that is dedicated to storing settings for the gain control structure. These example embodiments may enable fast switching of gain settings and phase settings independent of each other.

In some embodiments of the present disclosure, the first area in memory and second area in memory are separately addressable areas in a same memory structure. These embodiments may enable fast switching of the above-described settings with a relatively small footprint.

In some of the above embodiments in which the first area in memory and second area in memory are separately addressable areas in a same memory structure, the beamformer circuit may also comprise a memory controller. Further, the beamformer circuit may be configured to send, in response to receiving an instruction to produce a first beam, a first call for a phase setting in the first area and a second call for a gain setting in the second area from the memory controller to the memory structure. These embodiments may further enable efficient separate addressing and calling of the first area and second area.

In some of the above embodiments in which the first area in memory and second area in memory are separately addressable areas in a same memory structure, the beamformer circuit may be configured to switch between a first beam mode and a second beam mode. In the first beam mode, the beamformer circuit is configured to receive a memory address as input. In the second beam mode, beamformer circuit is configured to receive a beam parameter as input in the second beam mode. These example embodiments may further enable the fast switching of the above-described settings.

In some of the above embodiments in which the first area in memory and second area in memory are separately addressable areas in a same memory structure, the beamformer circuit may also comprise a mapper circuit. The mapper circuit is configured to receive a first phase value from a phase calculator and, based on a configured mode of the mapper subcircuit, map the first phase value to a memory address at which corresponding settings are stored. These embodiments may enable the beamformer circuit to quickly switch between configurations based on the configured mode of the mapper subcircuit.

In some embodiments of the present disclosure, the first area in memory is a first memory structure and the second area in memory is a second memory structure. These embodiments may enable fast switching of the above-described settings with a high amount of independence and a large number of possible beam configurations.

In some of the above embodiments in which the first area in memory and second area in memory are on separate memory structures, the beamformer circuit may also comprise a memory controller. Further, the beamformer circuit may be configured to send, in response to receiving an instruction to produce a first beam, a first call from the memory controller to the first memory structure and a second call to the second memory structure. These embodiments may further enable efficient separate addressing and calling of the first area and second area.

In some of the above embodiments in which the first area in memory and second area in memory are on separate memory structures, the beamformer circuit may be configured to switch between a first beam mode and a second beam mode. In the first beam mode, the beamformer circuit is configured to receive a memory address as input. In the second beam mode, beamformer circuit is configured to receive a beam parameter as input in the second beam mode. These example embodiments may further enable the fast switching of the above-described settings.

In some of the above embodiments in which the first area in memory and second area in memory are on separate memory structures, the beamformer circuit may also comprise a mapper circuit. The mapper circuit is configured to receive a first phase value from a phase calculator and, based on a configured mode of the mapper subcircuit, map the first phase value to a memory address at which corresponding settings are stored. These embodiments may enable the beamformer circuit to quickly switch between configurations based on the configured mode of the mapper subcircuit.

Some example embodiments of the present disclosure are represented by a method of controlling a beamformer circuit. The method comprises sending, for an intended beam, a first call to a first area in memory on a front-end subcircuit. The method further comprises sending, for the intended beam, a second call to a second area in memory on the front-end subcircuit. In these example embodiments, the first area in memory is dedicated to storing settings for a phase control structure on the front-end subcircuit. Further in these embodiments, the second area in memory is dedicated to storing settings for a gain control structure on the front-end subcircuit. This method may enable fast and independent selection of phase and gain settings for the independent beam. In some of the above embodiments of the method, the first area in memory and the second area in memory are in a same memory structure. These embodiments may enable fast independent selection of the above-described settings with a relatively small footprint.

In some of the above embodiments of the method, the first area in memory is a first memory structure and the second area in memory is a second memory structure. These embodiments may enable fast switching of the above-described settings with a high amount of independence and a large number of possible beam configurations.

In some of the above example embodiments of the method in which the first area in memory and the second area in memory are in a same memory structure and in which the first area in memory is a first memory structure and the second area in memory is a second memory structure, the method may further comprise configuring, based on receiving a beam mode input, the beamformer circuit into an arbitrary beam shape configuration. This may enable fast switching of beam modes.

In some of the above example embodiments of the method in which the first area in memory and the second area in memory are in a same memory structure and in which the first area in memory is a first memory structure and the second area in memory is a second memory structure, the method may further comprise receiving, in the arbitrary beam shape configuration, a memory address. In these embodiments, the first call comprises forwarding the memory address to the first area in memory. This may enable fast forming and refinement of arbitrary shaped beams.

In some of the above example embodiments of the method in which the first area in memory and the second area in memory are in a same memory structure and in which the first area in memory is a first memory structure and the second area in memory is a second memory structure, the method may further comprise configuring, based on receiving a beam mode input, the beamformer circuit into a pre-determined-beam-shape configuration. This may enable fast switching of beam modes.

In some of the above example embodiments of the method in which the first area in memory and the second area in memory are in a same memory structure and in which the first area in memory is a first memory structure and the second area in memory is a second memory structure, the method may further comprise receiving, in the pre-determined-beam-shape configuration, a beam parameter. The method may further comprise calculating, using a phase calculator and based on the beam parameter, a phase value. The method may further comprise mapping, using a mapper, the phase value to a memory address. In these embodiments, sending the first call comprises forwarding the memory address to the first area in memory. This may enable fast forming and refinement of beams of a pre-determined beam shape.

In some of the above example embodiments of the method in which the first area in memory and the second area in memory are in a same memory structure and in which the first area in memory is a first memory structure and the second area in memory is a second memory structure, and in which the method may further comprise configuring the beamformer circuit into an arbitrary beam shape configuration and in which the method may further comprise configuring the beamformer circuit into a pre-determined-beam-shape configuration, the method may further comprise configuring, based on receiving a first gain mode input, the beamformer circuit into a gain-independent mode. The method may further comprise configuring, based on receiving a second gain mode input, the beamformer circuit into a gain-dependent mode. This may enable fast beam refinement using phase adjustment independent of gain settings and gain adjustment independent of phase settings.

Some example embodiments of the present disclosure are represented by a method of controlling a beamformer circuit. The method comprises sending, for an intended beam, a first call to a first area in memory on a front-end subcircuit. In the method, the first area in memory is dedicated to storing settings for a first control structure on the front-end subcircuit. In the method, the beamformer circuit also comprises a second area in memory that is dedicated to storing settings for a second control structure on the front-end subcircuit. This method may enable fast and independent production and refinement of beams using independently controlled control structures.

FIGS. 1A and 1B, for example, illustrate a configurable beamformer integrated circuit 100 (sometimes referred to as "beamformer 100") that can be switched between an arbitrary beam-shape mode and a pre-determined beam-shape mode. Of note, beamformer 100 is intended as a simplified, abstracted circuit diagram for the sake of understanding. The precise components and the relative sizes and locations thereof are thus not intended to be literal depictions of the actual use cases of the embodiments of the present disclosure. Also it should be noted that the circuit and description is for the case of a transmitter but equivalent operation in the receiver case or a transceiver case is implicit. Additional components may exist in different embodiments, for example Low Noise Amplifiers (LNA), Power Amplifiers (PA), mixers.

Beamformer 100 contains mode selector circuit 102. Mode selector circuit 102 may be configured to receive, as input, beam mode input 101. Beam mode input 101 may take the form, for example, of either an "arbitrary beam" input (e.g., a "first input") or a "pre-determined beam" input (e.g., a "second input"). Mode selector circuit 102 may also be configured to change the configuration of beamformer 100 dependent upon the input 101 received by mode selector circuit 102. The properties of beam mode input 101 may depend on the properties of mode selector circuit 102. Mode selector circuit 102 may take the form, for example, a unit with a graphical user interface, software, or a non-user-interactable circuit that is configured to receive a beam mode input from another system.

Beamformer 100 also contains beam-mode multiplexer 104 within front-end subcircuit 108. Beamformer 100 contains a plurality of front-end subcircuits, one for each front-end/antenna port. Beam-mode multiplexer 104 can be switched by mode selector circuit 102 between two configurations based on signal 106. The configuration of beam-mode multiplexer 104 determines whether input 110 or input 112B is forwarded throughout front-end subcircuit 108. Of note, only one front-end subcircuit 108 (denoted by a dashed line) is illustrated in FIGS. 1A-1B for the sake of simplicity and understanding. In typical implementations, however, beamformer 100 would control the settings for the signals of multiple antennas in an array, and each of those antennas may have a separate front-end subcircuit. In those implementations, mode selector circuit 102 would control the configurations of a beam-mode multiplexer in each of those front-end subcircuits.

FIG. 1A, for example, illustrates a first depiction of beamformer 100 in an arbitrary beam shape mode. In the arbitrary beam shape mode, mode selector circuit 102 sends a particular signal 106A to beam-mode multiplexer 104. This particular signal may be, for example, a "high" (as opposed to a "low") signal or an "on" signal (as opposed to no signal). In response to receiving signal 106A, beam-mode multiplexer 104 forwards input 110, as opposed to input 112B, to phase and gain settings memory structure 114 in front-end subcircuit 108. Input 110 may take the form, for example, of a memory address in the form of a beam index or pointer. The specific address in the phase and gain settings memory structure 114 contains the phase and gain settings that, in concert with all the front ends, creates the desired beam of a particular arbitrary shape and direction. The contents of the phase and gain settings memory structure 114 are already pre-loaded by the external controller.

Beam-mode multiplexer 104 forwards input 110 to phase and gain settings memory structure 114. Phase and gain settings memory structure 114 may take the form of, for example, an SRAM. The address information forwarded to phase and gain settings memory structure 114 is used to output gain settings 116A to gain-control structure 118 and phase settings 116C to phase-control 120. Gain control structure also receives signal input 132. Gain-control structure 118 sets the gain of the signal input 132 based on the gain settings within gain settings 116A, and applies the amplified signal 124 to phase-control structure 120. Phase-control structure 120 sets the phase shift of the amplified signal based on the phase settings within phase settings 116C and applies the signal to the antenna via signal output 126A. In some embodiments, this phase shift may take the form of a phase delay.

Gain-control structure 118 may take the form, for example, of an amplifier, and phase-control structure 120 may take the form, for example, of a phase shifter that shifts the signal on antenna 122 with respect to other antennas in the array. Of note, the specific signal and settings-control paths between phase and gain settings memory structure 114, gain-control structure 118, and phase-control structure 120 are presented here as an example configuration. In some other embodiments, the signal and control settings could take different paths between different circuit configurations. For example the order of the gain and phase control structures with respect to the input signal 132 could be reversed, or there could be other passive or active building blocks before or after the control structures, such as additional amplifiers or filters.

FIG. 1B, on the other hand, illustrates a second depiction of beamformer 100 in a pre-determined beam shape mode. In the pre-determined beam shape mode, mode selector circuit 102 sends signal 106B, as opposed to signal 106A, to beam-mode multiplexer 104. Signal 106B may be, for example, a "low" signal (as opposed to a "high" signal) or even the absence of a signal (as opposed to an actual signal being sent). In response to receiving signal 106B, beam-mode multiplexer 104 forwards input 112B, as opposed to input 110, to phase and gain settings memory structure 114 in front-end subcircuit 108. Input 112B may take the form, for example, of the memory address that contains the phase and gain settings that correspond to the ideal phase values that were determined by on-chip phase calculator 128 (sometimes referred to herein as "phase calculator 128") to be necessary to be applied in front-end subcircuit 108 to create a beam of a pre-determined shape (e.g., a beam produced by a linear phase gradient across the antenna array, also referred to as a "sinc-shaped beam") in a desired direction.

As illustrated in FIGS. 1A and 1B, on-chip phase calculator 128 sends those ideal phase values to front-end subcircuit 108. More specifically, on-chip phase calculator 128 sends input 112A to mapper 134 within front-end subcircuit 108. Mapper 134 receives the phase values within input 112A and maps those ideal phase values to memory addresses within phase and gain settings memory structure 114. The settings at those memory addresses could, when output by phase and gain memory structure 114, be applied in front-end subcircuit 108 to create the beam of a pre-determined shape. In other words, mapper 134 receives phase values in input 112A, maps them to memory addresses, and forwards those addresses to beam-mode multiplexer 104 as part of input 112B.

Of note, in some embodiments, a mapper, such as mapper 134, can also be used to adjust the phase and gain settings that are selected based on environmental conditions and beamformer configurations. For example, mapper 134 may output, for the same set of ideal phase values in input 112A, different outputs based on the configuration of beamformer 100. Specifically, mapper 134 may map those ideal phase values to a first set of memory addresses that correspond to a first set of settings when in a first configuration. Further, mapper 134 may map those ideal phase values to a second set of memory addresses that correspond to a second set of settings when in a second configuration. Further information related to this feature is provided in the discussion of mapper 320 in FIG. 3.

Of note, because mapper 134 is within front-end subcircuit 108, and because beamformer 100 contains a separate front-end subcircuit for each antenna in the array, beamformer 100 would also contain corresponding mappers within those separate front-end subcircuits. In typical operation, therefore, on-chip phase calculator 128 would send corresponding ideal phase values to other mappers in corresponding front-end subcircuits within beamformer 100.

For example, beamformer 100 may have received instructions that a linear-phase beam of a pre-determined, narrow shape was desired at a specific precise direction. This may occur if the precise location of the transmission recipient of the array is known and if a broad, imprecise beam would create interference at other devices in the area nearby the transmission recipient. In some embodiments, this instruction may take the form of two separate inputs. The first input may take the form of beam mode input 101 and may inform the mode selector circuit 102 that beamformer 100 should operating in "pre-determined beam mode." The second input may take the form of input 130 and may provide, to phase calculator 128, the desired direction of propagation of the beam of the antenna array. Input 130 to on-chip phase calculator 128 may sometimes be specifically as a phase slope, but may be referred to generically herein as the desired "beam parameters" of the beam.

Upon receiving the beam parameters, phase calculator 128 may use the beam parameters to calculate, for a beam of the pre-determined shape, phase shift values for each antenna in the array. Mapper 134 may then map those values to the memory structure in the front-end subcircuit associated with the antenna corresponding to the front-end subcircuit. Specifically, in the example illustrated in FIG. 1B, phase calculator 128 would calculate the phase shift values for antenna 122, output those values to mapper 134 in front-end subcircuit 108, and mapper 134 would map those values to a memory address in phase and gain settings memory structure 114 in front-end subcircuit 108.

Mapper 134 outputs the memory address as input 112B to beam-mode multiplexer 104. Further, because beam-mode multiplexer 104 received input 106B from mode selector circuit 102, beam mode multiplexer 104 forwards input 112B to phase and gain settings memory structure 114. Similar to as described in FIG. 1A, the address information in input 112B forwarded to phase and gain settings memory structure 114 is used to output gain settings 116B to gain-control structure 118 and phase settings 116D to phase-control 120. Gain-control structure 118 and phase-control structure 120 then amplify and shift the signal input 132 based on those settings and apply the amplified and phase-shifted signal 126B to antenna 122. Of note, in use cases in which beamformer 100 is configured to transmit or receive linear phase beams of a pre-determined shape, the role of gain-control structure 118 may be to compensate for variable loss in the phase slope or to applying tapering to control sidelobe levels.

Of note, beamformer 100 is depicted as containing a single memory structure in the front end subcircuit. In some embodiments of the present disclosure, such beamformer circuits may store phase and gain settings in the memory structure such that they are dependent upon each other. In other words, a single memory address in a front-end subcircuit's memory structure may store both a phase-shift setting and a gain setting. These embodiments may have the advantage of requiring a simpler circuit design and simpler memory management because only one memory address would be required to send gain and phase settings to the gain control structure and phase control structure. However, these embodiments may also have the disadvantage that the number of unique combinations of phase settings and gain settings may be significantly reduced. Specifically, the number of phase and gain settings may be limited to the number memory addresses in the memory structure.

Thus, some embodiments of beamformer 100 may address phase settings and gain settings in separately addressable, dedicated areas of phase and gain settings memory structure 114. For example, in the arbitrary beam shape mode, if phase and gain settings memory structure supported 128 addressable rows, the first 64 rows may contain phase settings and the last 64 rows may contain gain settings. In this example, rather than 128 possible combinations of phase and gain settings, there would be 4096 potential combinations of phase and gain settings.

In some embodiments, for example, memory structure 114 may have a first table that is dedicated to phase settings and a second table that is dedicated to gain settings. As used herein, an area of memory (e.g., a table) that is "dedicated" to a particular type of setting for an antenna structure (e.g., settings for a phase shifter) should be interpreted as not containing other types of settings for that antenna structure (e.g., settings for a gain amplifier). Thus, a table that is dedicated to phase settings would not also contain gain settings.

However, embodiments in which phase settings and gain settings are stored separately in phase and gain settings memory structure 114 would likely require an additional memory controller added to front-end subcircuit 108. This memory controller could organize performing multiple calls to memory for a single input (e.g., input 112). In other words, when beamformer circuit 100 received instructions to produce a particular beam, memory structure would send two calls to phase and gain settings memory structure 114. The first call may be for the value of phase settings in the first area of memory (e.g., a first table dedicated to phase settings) and the second call may be for the value of phase settings in the second area of memory (e.g., a second table dedicated to gain settings).

In some use cases, performing multiple calls for a single memory structure could result in higher memory-control overhead. To address this, some embodiments of the present disclosure utilize multiple memory structures (e.g., SRAMs) in a front-end subcircuit.

For example, FIG. 2 illustrates depiction of a configurable beamformer integrated circuit 200 (sometimes referred to herein as "beamformer 200") with separate phase and gain memories. Beamformer 200 enables fast switching of the gain settings independently from fast switching of the phase settings. For example, changing the tapering for a given beam direction, or changing of beamwidth for a given direction, or changing of direction for a given beamwidth and tapering. It is of course possible to achieve fast simultaneous switching of both phase and gain settings too.

It should be noted that the circuit and description of beamformer 200 is for the case of a transmitter but equivalent operation in the receiver case or a transceiver case is implicit. Additional components may exist in different embodiments, for example Low Noise Amplifiers (LNA), Power Amplifiers (PA), mixers.

Like beamformer 100, beamformer 200 contains a plurality of front end subcircuits, each of which corresponding to a front-end/antenna port. As illustrated, front-end subcircuit 202 controls the signal of antenna 204. Also similar to beamformer 100, beamformer 200 contains on-chip phase calculator 206 (sometimes referred to herein as "phase calculator 206"), a mapper 207, a mode selector circuit 208 and a beam mode multiplexer 210. Mode selector circuit 208, similar to mode selector circuit 102, receives an input (a "beam mode input") that specifies whether beamformer 200 should operate in an arbitrary-beam mode or a predetermined beam shape mode.

In the arbitrary beam mode, mode selector 208 sends an input to beam mode multiplexer 210 that causes beam mode multiplexer 210 to forward input 212. Input 212 may take the form of the memory address (or memory addresses) for the phase and gain settings that have been calculated off beamformer 200, and previously pre-loaded in the memory, to create a beam of a desired arbitrary shape and desired direction.

In the pre-determined beam shape mode, mode selector 208 sends an input to beam mode multiplexer 210 that causes beam mode multiplexer 210 to forward input 214B from mapper 207. The phase values calculated by on-chip phase calculator 206 would be output as 214A and mapped to one or more memory address by mapper 207 before being forwarded to beam mode multiplexer 210 as input 214B. Of note, however, in some other embodiments not depicted in FIG. 2, the phase values may be mapped by a mapper circuit within each front-end subcircuit, as illustrated in FIGS. 1A and 1B. Thus, input 214B may take the form of the memory address (or memory addresses) for the phase and gain settings that correspond to the phase and gain values that have been calculated by phase calculator 206 as creating a beam of a pre-determined shape towards a desired direction.

In both the arbitrary beam shape mode and the pre-determined beam shape mode, beam mode multiplexer 210 outputs a memory address to phase settings memory structure 216. Phase settings memory structure 216 is, in some embodiments, a dedicated memory that only contains phase-shift settings for antenna 204. Thus, the memory address contained in input 212 or input 214B could contain a set of phase-shift settings within phase settings memory structure 216. Similar to beamformer 100, these phase-shift settings can be output from phase settings memory structure 216 to phase control structure 218, which then alters the phase of the signal transmitted by antenna 204 with respect to other antennas in the array.

As illustrated, beam mode multiplexer 210 also outputs a memory address to gain selection multiplexer 220. Gain selection multiplexer 220 is controlled by mode selector circuit 222. Mode selector circuit 222 may take a similar form to mode selector circuit 102. Further, while mode selector circuit 222 is illustrated as a separate structure from mode selector circuit 208, in some embodiments of the present disclosure mode selector circuits 222 and 208 could be the same structure that controls the operation of both beam mode multiplexer 210 and gain selection multiplexer 220.

Mode selector circuit 222 outputs signal 224 to gain selection multiplexer 220. Specifically, the value of signal 224 (e.g., high or low, on or off) determines the input that gain selection multiplexer 220 forwards to gain settings memory structure 226. In a first mode (sometimes referred to herein as "gain-dependent mode"), gain selection multiplexer 220 forwards the memory address that was received from beam mode multiplexer 210. In other words, in this first mode, beamformer 200 operates front-end circuit 202 as if the phase settings and gain settings are interdependent and would output the same memory address from gain settings memory structure 226 that is also output from phase settings memory structure 216. This would effectively treat the entries of phase settings memory structure 216 and of gain settings memory structure 226 as if they were at the same memory address on a single memory structure.

Utilizing this gain-dependent mode may be useful in situations in which the gain settings of antenna 204 are determined directly by the phase settings of antenna 204. For example, in a situation in which the amplitude of signal on antenna 204 must be adjusted for each degree that the signal on antenna 204 is shifted out of phase from the signals on other antennas in the array, beamformer 200 may need to output specific, pre-determined gain settings for a particular phase value. In another example, the gain control structure 230 can compensate for gain variations in phase control structure 218 in such a way that the signal amplitude at antenna 204 remains constant for different desired phase shift values.

However, in situations in which the phase settings and gain settings could be independently controlled, mode selector circuit 222 may output a second value of signal 224 to switch gain selection multiplexer 220 into a second mode. In this second mode (sometimes referred to herein as "gain-independent mode"), gain selection multiplexer forwards a memory address received from input 228. Input 228 may, for example, be a memory address of a gain setting that was determined off of beamformer 200, similar to input 212. This gain setting may have been calculated completely independently of either input 212 or input 214A, and thus may greatly increase the combinations of gain and phase settings produced by front-end circuit 202. For example, if phase settings memory structure 216 and gain settings memory structure 226 each contained 256 addressable rows (and thus 256 sets of phase and gain settings respectively) and all of them are used for the arbitrary beam mode, front-end subcircuit 202 could output 256 different combinations of phase and gain settings in gain-dependent mode, but 65,536 theoretical combinations of phase and gain settings in gain-independent mode.

Gain settings memory structure 226 is, in some embodiments, a dedicated memory that only contains gain settings for antenna 204. Thus, the memory address contained in input 212, input 214B, or input 228 could contain a set of gain settings within gain settings memory structure 226. Similar to beamformer 100, these gain settings can be output from gain settings memory structure 226 to gain-control structure 230, which may be, for example, a variable gain amplifier. Gain-control structure 230 then controls the gain of signals transmitted by (or received from) antenna 204 with respect to other antennas in the array.

As noted, beamformer circuits that contain separate memory structures for phase settings and gain settings can significantly increase the possible number of beam settings that can be output to an antenna. However, as has also been noted, the ability to select all those theoretical beam settings can be limited if a memory controller is not also installed into the beamformer circuit. For this reason, some embodiments of the present disclosure not only are designed with separate memory structures for phase settings and gain settings, but also with a memory controller to manage the memory structures.

Figure 3:
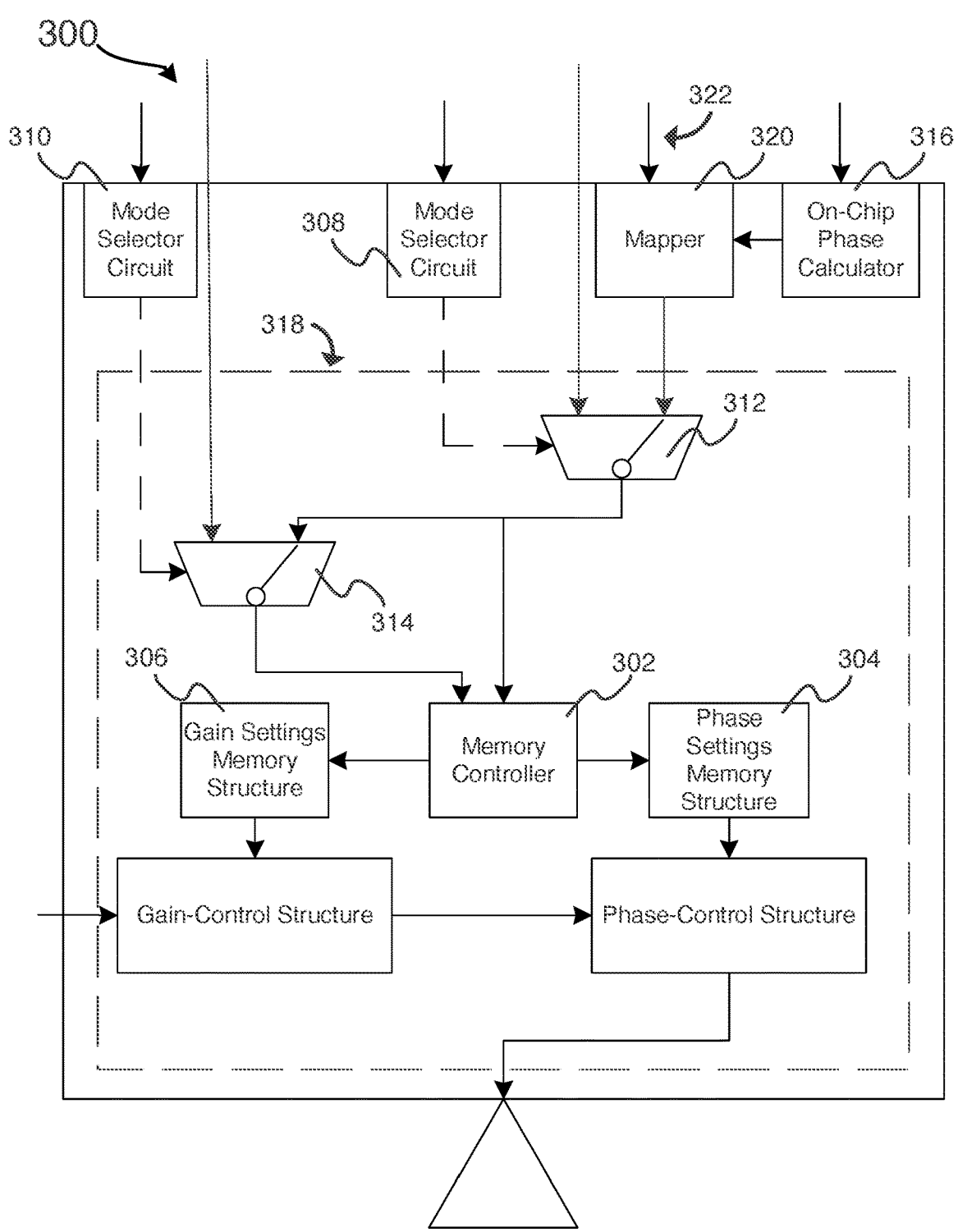
FIG. 3 illustrates a depiction of a configurable beamformer integrated circuit with a memory controller and independent phase and gain memory units.

For example, FIG. 3 illustrates a depiction of a configurable beamformer integrated circuit 300 (sometimes referred to herein as "beamformer 300") with a memory controller 302 and independent phase and gain memory structures 304 and 306.

It should be noted that the circuit and description of beamformer 300 is for the case of a transmitter but equivalent operation in the receiver case or a transceiver case is implicit. Additional components may exist in different embodiments, for example Low Noise Amplifiers (LNA), Power Amplifiers (PA), mixers.

For the purpose of simplicity, much of beamformer 300 is depicted as organized and functioning similarly to beamformer 200. For example, Beamformer 300 contains mode selector circuits 308 and 310, which may function similarly to mode selector circuits 208 and 222 respectively. Multiplexers 312 and 314 may also function similarly to multiplexers 210 and 220, respectively. Also similar to beamformer 200, beamformer 300 enables fast switching of the gain settings independently from fast switching of the phase settings. For example, changing the tapering for a given beam direction, or changing of beamwidth for a given direction, or changing of direction for a given aperture and tapering. It is of course possible to achieve simultaneous fast switching of both phase and gain settings too.

Beamformer 300 also contains phase calculator 316, which may also function similarly to phase calculator 206. However, because phase calculator 206 is outputting, in some configurations of beamformer 300, to memory controller 302 rather than directly to a memory structure, the nature of the output of phase calculator 316 may differ slightly. For example, in configurations in which multiplexers 312 and 314 have both been configured to forward the output of mapper 320, memory controller 302 would only receive memory addresses for phase and gain settings from mapper 320.

Memory controller 302, upon receiving two memory addresses, could be configured to determine which of those two memory addresses contain phase-shift settings in phase settings memory structure 304 and which of those two memory addresses contain gain settings in gain settings memory structure 306. Thus, even in instances in which all beam parameters are forwarded to front-end subcircuit 318 from phase calculator 316, the phase settings and gain settings could be controlled independently of each other.

Phase calculator 316 is outputting to multiplexer 312 through a mapper circuit. Specifically, mapper 320 may receive the values calculated by phase-calculator 316, map them to one or more memory addresses, and forward them to multiplexer 312. However, mapper 320 may, under certain configurations, map the values calculated by on-chip phase calculator to account for certain use-case conditions. For example, while not provided in detail in the figures herein, in some use cases, the transmission and reception circuitry of an antenna array may be different and thus require different phase and gain settings. In other words, the settings contained in memory structures 304 and 306 to configure an antenna for transmitting a beam of a particular shape and direction may be different than the settings to configure the antenna for receiving a beam of the exact same shape and from the exact same direction. In these instances, mapper 320 may be set to a "transmission mode" or a "receiver mode." In some such embodiments, mapper 320 may be set to a transmission mode by default. In other embodiments, mapper 320 may be set to a receiver mode by default. In some embodiments, neither mode may be considered a "default."

For example, if mapper 320 is set in a "receiver mode," mapper 320 may receive values from on-chip phase calculator 316, but map them to the memory address locations of those same settings for receiving a beam of that predetermined shape and from that desired direction. This may be particularly advantageous, for example, if phase settings memory structure 304 and gain settings memory structure 306 are organized such that the memory address for receiving a beam of a particular shape and from a particular direction are offset by a pre-determined amount (e.g., 128 rows, 1 row) from the phase and gain settings for transmitting a beam of that particular shape and from that particular direction.

Similarly, mapper 320 could be set into other modes depending on the use cases of the antenna array. As illustrated, the mode of mapper 320 could be set based on mapper mode input 322. For example, mapper 320 could be set to a "high temperature" mode when the operating temperature is within a pre-determined high range, a "default temperature" mode when the operating temperature is in a pre-determined moderate range, and a "low temperature" mode when the operating temperature is in a pre-determined low range. Similarly, mapper 320 could be switched into different modes based on the frequency band over which the array of antennas is communicating.

In the above examples, mapper 320 could be configured to map the addresses output by on-chip phase calculator 316 based on the mode into which mapper 320 is set. In some embodiments, this may involve either forwarding the addresses as is in a "default" mode or applying an offset (e.g., −64 rows) to the addresses.

In other embodiments, this may involve more complex mapping, such as inputting the addresses into a complex remapping algorithm that takes into account all active modes (e.g., high temperature, receive, 500 MHz higher frequency band). In some embodiments, mapper 320 could also be configured to avoid calling rows in the memory that are faulty. For example, if a row in phase settings memory structure 304 has a very high rate of read errors, mapper 320 could be configured to now use that row even when on-chip phase calculator outputs the addresses at that row. In some embodiments, the values from that row could be relocated to another row in phase settings memory structure 304, in which case mapper 320 could map the faulty row that corresponds to the values output by on-chip phase calculator 316 to the relocated row.

While the described embodiments show an "on-chip phase calculator" that calculates phase values, a beamformer can also include an on-chip calculator that calculates both phase and gain values. In this case, the mapper would map the phase and gain values to phase and gain addresses that are eventually forwarded by the memory controller to the phase and gain settings memory structures. Also, while the embodiments show the phase-calculator as belonging to the beamformer, it is possible to have a separate calculator within each front-end. Such an implementation would likely occupy larger area but would also likely improve the speed of beam switching.

Figure 4:
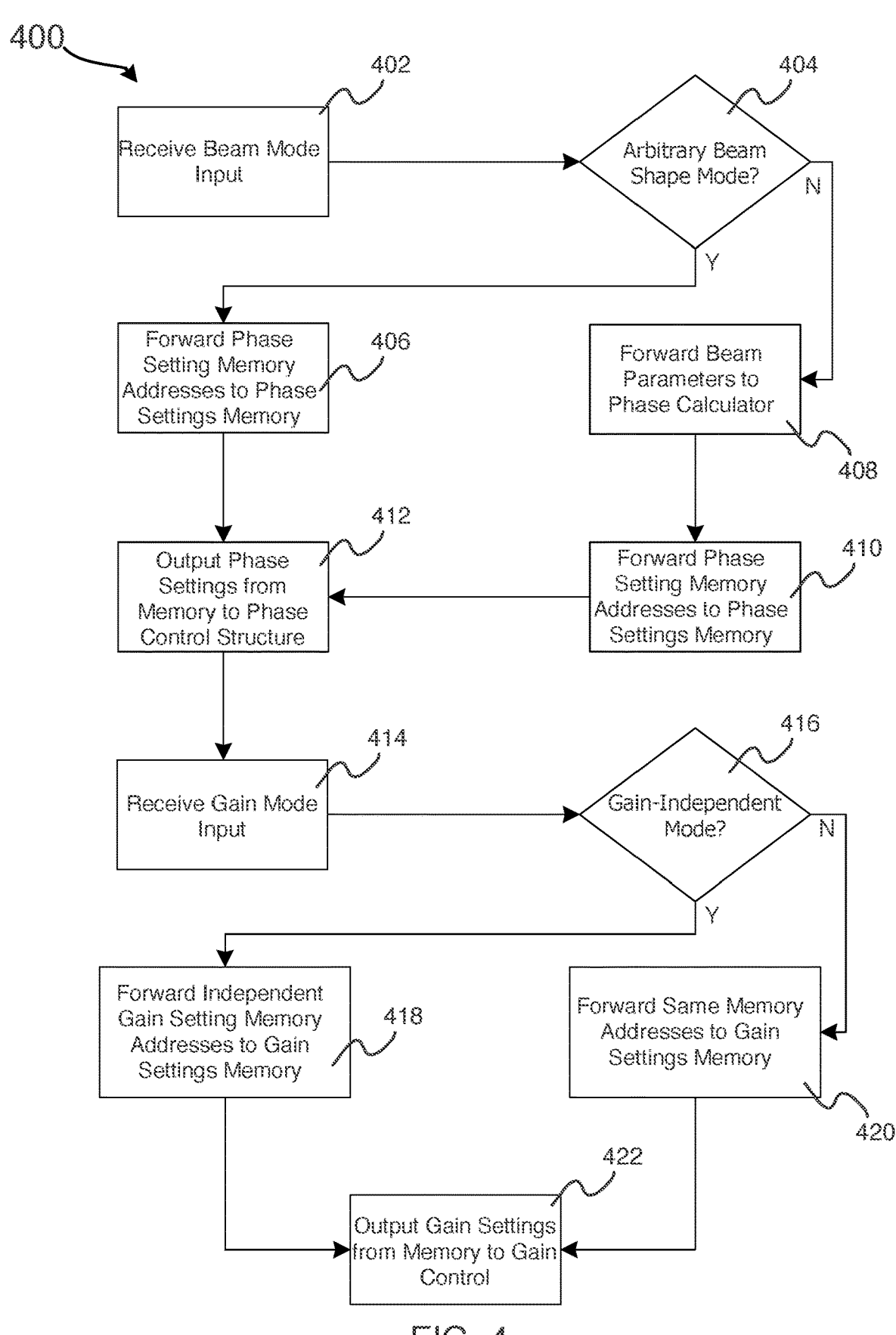
FIG. 4 illustrates a first method of operating a configurable beamformer integrated circuit in accordance with embodiments of the present disclosure.

Some embodiments of the present disclosure can also be illustrated as a process of utilizing a configurable beamforming integrated circuit. For example, FIG. 4 illustrates an example method 400 of operating a configurable beamformer integrated circuit in accordance with embodiments of the present disclosure. Method 400 could be used, for example to operate beamformer circuits 100, 200, or 300. Method 400 enables fast switching of the gain settings independently from fast switching of the phase settings. For example, changing the tapering for a given beam direction, or changing of beamwidth for a given direction, or changing of direction for a given beamwidth and tapering. It is of course possible to achieve fast simultaneous switching of both phase and gain settings too.

Method 400 begins in block 402, in which a beam mode input is received by the beamforming circuit. This input may be received by, for example, a beam-mode selector and from a system that is separate from the beamformer circuit. The beam mode input may take the form, for example of an instruction to configure the beamformer circuit into an "arbitrary beam shape" mode or a "pre-determined beam shape" mode.

Method 400 continues in block 404, in which the beamformer circuit determines whether the beam mode input received in block 402 instructs the beamformer circuit to adopt an "arbitrary beam shape" configuration. This may, in some embodiments, resemble a beam-mode selector identifying whether the beam mode input (e.g., a voltage signal) has a first property (e.g., a "high" voltage signal, such as 5V) or a second property (e.g., a "low" voltage signal, such as 0V).

In the event that the beamformer circuit does determine in block 404 that the beam mode input does instruct the beamformer to adopt an arbitrary beam shape configuration, the beamformer circuit may configure itself in an arbitrary beam configuration and proceed to block 406. In block 406, the beamformer circuit forwards a set of received memory addresses for phase settings to a phase settings memory structure. For example, the beamformer circuit may have received, from another circuit system, a set of memory addresses that contain specific preloaded phase values that themselves were calculated to be necessary to create a beam of a desired arbitrary shape and direction. These memory addresses, then, may be forwarded in block 406 to a memory structure that contains phase-shift settings for an antenna in the array.

In some embodiments, forwarding the memory addresses in block 406 may include forwarding the same set of memory addresses (e.g., a row address) to every front-end subcircuit in the array. A memory structure in each front-end subcircuit may, at that memory address, contain a set of phase settings that is specific to the antenna for that front end subcircuit and that, when combined with the other phase settings for the other antennas in the array, result in a beam of the desired arbitrary shape and direction.

In some embodiments, forwarding the memory addresses in block 406 may include forwarding a default/group memory address to a set of memory controllers, each of which is on a front-end subcircuit that controls the signals transmitted or received by a different antenna in the array. In these embodiments, each memory controller may be configured to calculate, using the received default/group memory address, the specific memory address of the proper phase settings for the antenna associated with that memory controller. The memory controller may then forward that specific memory address to a phase settings memory structure on the same front-end subcircuit.

In some embodiments, the beamformer circuit may, in the arbitrary-beam shape mode, receive a unique memory address for each front-end subcircuit in the beamformer circuit. In these embodiments, block 406 may involve forwarding each of those unique memory addresses direction to a memory structure on the front-end subcircuit for which that particular memory address was intended.

If, on the other hand, the beamformer circuit does not determine, in block 404, that the beam mode input instructs the beamformer to adopt an arbitrary beam shape configuration, the beamformer circuit may configure itself in a pre-determined beam shape configuration and proceed to block 408. In block 408, the beamformer circuit forwards a set of received beam parameters to a phase calculator on the beamformer circuit chip. For example, the beamformer circuit may have received, from another circuit system, a set of desired properties of a beam that an antenna array will transmit or receive. These properties may include, for example, the slope of the phase shift values of signals along the antenna array to form a beam of a pre-determined shape. The phase calculator may then calculate, for each antenna in the array, a set of phase-shift values necessary for the array to produce the desired beam. A mapper may also map those values to a set of memory addresses in a phase settings memory structure in each front-end subcircuit for the array.

The beamformer circuit proceeds, after block 408, to block 410 in which the beamformer circuit forwards the mapped set of memory addresses for the phase values to a phase settings memory structure on a front-end subcircuit. In some embodiments, this may include mapping and forwarding settings to a unique memory address to each of a set of memory structures, each of which is a front-end subcircuit.

In some embodiments, block 410 may also involve forwarding a memory address or set of memory addresses from the phase calculator to a mapper subcircuit for the beamformer circuit. In these embodiments, this mapper subcircuit may, based on the mode into which the mapper subcircuit (or the beamformer circuit itself) has been configured, map the memory address or set of memory addresses to correspond to a different set of phase settings that take into account the use-case conditions of that mode. For example, in some instances a beamformer circuit may be configured to utilize an alternate frequency band for transmissions (or receptions) to avoid interference. In these instances, the phase calculator may continue to output a set of ideal phase values. The mapper subcircuit may then map the phase values to the memory addresses that contain the phase-shift settings for the alternate frequency band.

The beamformer circuit proceeds to block 412 after either block 406 or block 410. In block 412 the beamformer circuit outputs the settings located at the forwarded memory addresses at each phase settings memory structure to a phase control structure for the corresponding front-end subcircuit. In some embodiments, this phase control structure may take the form of a phase shifter that, with the phase settings, shifts the signal on the antenna to which that front-end subcircuit is connected.

Method 400 also contains block 414, in which the beamformer circuit receives a gain mode input. This gain mode input may instruct the beamformer circuit to configure itself in a gain-independent mode or a gain-dependent mode, and may be received at a mode selector circuit similar to mode selector circuit 222.

Method 400 continues in block 416, in which the beamformer circuit determines whether the gain mode input received in block 414 instructs the beamformer circuit to adopt a gain-independent configuration. This may, in some embodiments, resemble a beam-mode selector identifying whether the beam mode input (e.g., a voltage signal) has a first property (e.g., a "high" voltage signal, such as 5V) or a second property (e.g., a "low" voltage signal, such as 0V).

In the event that the beamformer circuit does determine, in block 416, that the gain mode input instructs a gain-independent mode, the beamformer circuit forwards, in block 418, a set of independent gain setting memory addresses to a gain settings memory. These independent memory addresses may have been obtained, for example, from a separate circuit off the beamformer circuit, and may be different than the memory addresses received as part of block 406 or mapped as part of block 410.

In the event that the beamformer circuit determines, in block 416, that the gain mode input instructs a gain-dependent mode, the beamformer circuit forwards, in block 420, the same set of memory addresses that was forwarded to the phase settings memory structure in either block 406 or 410. In other words, the beamformer circuit may use for gain settings, in block 420, the same memory addresses that the beamformer circuit uses for phase settings in either block 406 or 410.

The beamformer circuit proceeds to block 422 after either block 418 or block 420. In block 422 the beamformer circuit outputs the settings located at the forwarded memory addresses at each gain settings memory structure to a gain control structure for the corresponding front-end subcircuit. In some embodiments, this gain control structure may take the form of a variable gain amplifier.

Of note, as illustrated in FIG. 4, phase and gain control operations are sequential. However, this is merely for the ease of presentation. However, in some embodiments these control operations could be performed in parallel. Further, in some embodiments, upon selecting a mode as a result of block 404, multiple gain and/or phase configuration operations could be executed in sequence.

Figure 5:
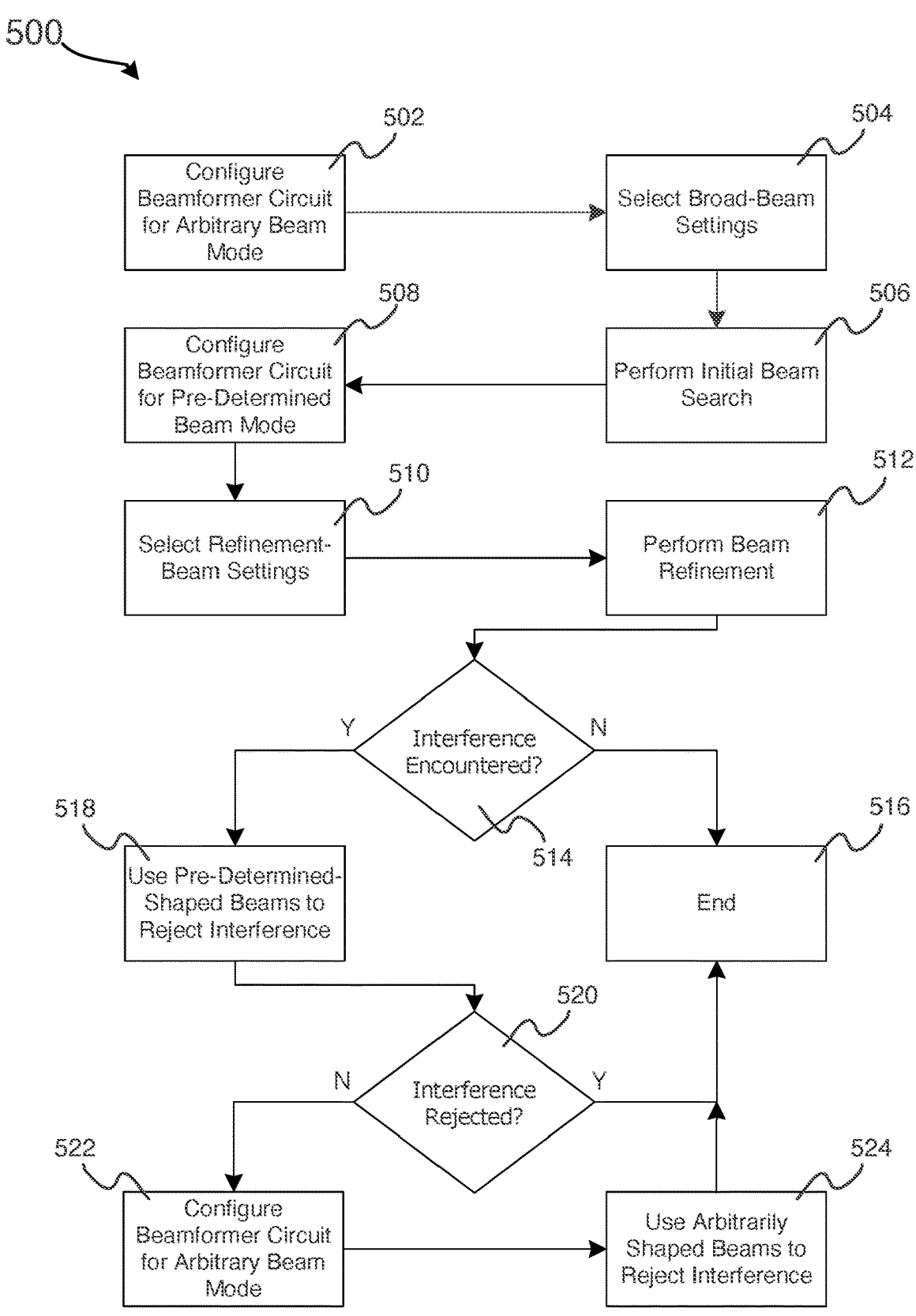
FIG. 5 illustrates a second method of operating a configurable beamformer integrated circuit in accordance with embodiments of the present disclosure.

FIG. 5 illustrates a method 500 of operating a configurable beamformer integrated circuit in accordance with embodiments of the present disclosure. Method 500 could be used, for example to operate beamformer circuits 100, 200, or 300. Specifically, method 500 illustrates operating a beamformer circuit to efficiently search, perform beam refinement, and reject interference. In some implementations, the initial beam produced during beam search may be referred to as a first intended beam, and subsequent beams during refinement and interference rejection may be referred to as subsequent intended beams.

Method 500 begins in block 502, in which a beamformer circuit is configured for arbitrary beam mode. This could be accomplished, for example, by providing a beam-mode input to mode selector circuit 102, mode selector circuits 208 and 222, or mode selector circuits 308 and 310. In some embodiments of the present disclosure, this may enable very fast configuration into an arbitrary-beam mode.

Method 500 continues in block 504, in which a set of broad-beam settings are configured to produce an intended beam with a broad search shape. This could be accomplished, for example, by forwarding a set of phase and gain settings memory addresses for the intended beam to a pair of phase and gain memory structures in each front-end subcircuit on the beamformer circuit.

Method 500 continues in block 506, in which an initial beam search is performed using the broad beam that is produced by the settings selected in block 504. In the initial beam search, broad beams may be used to quickly identify the general location of a target device (e.g., a device to which the beamformer circuit is intending to transmit or from which the beamformer device is intending to receive transmissions).

Upon completing the initial beam search, method 500 continues in block 508. In block 508, the beamformer circuit is reconfigured into pre-determined beam mode from arbitrary beam mode. Similar to the configuration performed in block 502, this could be accomplished, for example, by providing a beam-mode input to mode selector circuit 102, mode selector circuits 208 and 222, or mode selector circuits 308 and 310. In some embodiments of the present disclosure, this may enable very fast reconfiguration of the beamformer circuit from the arbitrary beam mode to the pre-determined beam mode.

Method 500 continues in block 510, in which a set of refinement beam settings for a second intended beam are selected. This could be accomplished, for example, by forwarding, from a phase calculator, a set of phase settings memory addresses to a set of phase settings memory structure in a set of front-end subcircuits on the beamformer circuit. The beams that are used for refinement and that result from these beam settings may typically result in a narrow beam, such as a sinc-shaped beam.

Method 500 continues in block 512, in which beam refinement is performed using the refinement beam that was produced in block 510. Beam refinement may involve iterating through thousands or tens of thousands of beams to find the beam with the best signal for the target device. This may result in identifying the specific location of the target device.

In block 514, method 500 determines whether interference was encountered during beam refinement. If no interference is encountered, method 500 ends in block 516.

However, if interference is encountered during beam refinement, method 500 proceeds to block 518, in which the beamformer circuit can be configured to use subsequent intended beams of a pre-determined shape in the pre-determined beam mode to reject the interference. This could involve, for example, altering the phase and gain settings to move the nulls in a sinc-shaped beam.

In block 520, method 500 determines whether the pre-determined-shaped beams were able to sufficiently reject the interference that was encountered during beam refinement. If the interference was successfully rejected, method ends in block 516.

However, if the interference was not successfully rejected, method 522 continues by reconfiguring the beamformer circuit from pre-determined beam mode back into arbitrary beam mode. This may involve, again, providing a beam-mode input to mode selector circuit 102, mode selector circuits 208 and 222, or mode selector circuits 308 and 310. Once again, this may be performed very quickly using the embodiments of the present disclosure.

Method 500 continues in block 524, in which arbitrarily shaped beams can be used for interference rejection. This may involve, for example, an arbitrary beam shape being calculated off the beamformer circuit. This arbitrary beam shape may have one or more nulls placed at the specific suspected locations of the interference. The settings for this arbitrary beam shape can then be input into the beamformer circuit by forwarding the memory addresses for the settings to one or more memory structures that contains the phase and gain settings necessary to produce the arbitrary beam.

Once an arbitrarily shaped beam is used to reject the interference in block 524, method 500 ends in block 516.

Various aspects of the present disclosure are described by narrative text, flowcharts, block diagrams of computer systems and/or block diagrams of the machine logic included in circuit embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Throughout this disclosure, the terms "circuit" and "subcircuit" are used to describe components of the embodiments. As used herein, these terms are used strictly for the purpose of encouraging the understanding of the relationships of the circuits involved herein. These terms are not intended to be interpreted as implying any properties other than a potential relationship to other circuits or subcircuits. For example, a "subcircuit" should be interpreted as a circuit that is part of another circuit. However, a subcircuit may contain other circuits that may be referred to as subcircuits of that original subcircuit. Further, circuits that are referred to as "circuits" may actually be a subcircuit of a larger circuit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A beamformer circuit comprising:
a phase calculator configured to calculate a phase value based on a beam parameter;
a mapper circuit configured to receive the phase value from the phase calculator and map the phase value to corresponding control settings for a phase control structure and a gain control structure;
a beam mode multiplexer circuit configured to receive the control settings at a first input and a phase memory address at a second input; and
a gain selection multiplexer circuit configured to receive an output from the beam mode multiplexer circuit at a first input and a gain memory address at a second input.

2. The beamformer circuit of claim 1, wherein the phase control structure is configured to receive an output directly from a first memory structure.

3. The beamformer circuit of claim 1, wherein the gain control structure is configured to receive an output directly from a second memory structure.

4. The beamformer circuit of claim 1, further comprising: a first memory structure configured to receive an output from the beam mode multiplexer circuit, wherein the first memory structure is dedicated to storing the output from the beam mode multiplexer circuit.

5. The beamformer circuit of claim 1, further comprising: a first mode selector circuit configured to receive a beam mode input, wherein the beam mode multiplexer circuit is further configured to receive the beam mode input from the first mode selector circuit as a selection signal.

6. The beamformer circuit of claim 1, further comprising: a second memory structure configured to receive an output from the gain selection multiplexer circuit, wherein the second memory structure is dedicated to storing the output from the gain selection multiplexer circuit.

7. The beamformer circuit of claim 1, further comprising: a second mode selector circuit configured to receive a gain mode input, wherein the gain selection multiplexer circuit is further configured to receive the gain mode input from the second mode selector circuit as a selection signal.

8. A method comprising:
receiving a beam parameter;
calculating, using a phase calculator, a phase value based on the beam parameter;
mapping, using a mapper circuit, the phase value to corresponding control settings for a phase control structure and a gain control structure;

receiving the control settings at a first input of a beam mode multiplexer circuit and a phase memory address at a second input of the beam mode multiplexer circuit;
receiving an output from the beam mode multiplexer circuit at a first input of a gain selection multiplexer circuit; and
receiving a gain memory address at a second input of the gain selection multiplexer circuit.

9. The method of claim 8, further comprising:
receiving, by the phase control structure, an output directly from a first memory structure.

10. The method of claim 8, further comprising:
receiving, by the gain control structure, an output directly from a second memory structure.

11. The method of claim 8, further comprising:
receiving, by a first memory structure, an output from the beam mode multiplexer circuit, wherein the first memory structure is dedicated to storing the output from the beam mode multiplexer circuit.

12. The method of claim 8, further comprising:
receiving, by a first mode selector circuit, a beam mode input, wherein the beam mode multiplexer circuit is further configured to receive the beam mode input from the first mode selector circuit as a selection signal.

13. The method of claim 8, further comprising:
receiving, by a second memory structure, an output from the gain selection multiplexer circuit, wherein the second memory structure is dedicated to storing the output from the gain selection multiplexer circuit.

14. The method of claim 8, further comprising:
receiving, by a second mode selector circuit, a gain mode input, wherein the gain selection multiplexer circuit is further configured to receive the gain mode input from the second mode selector circuit as a selection signal.

* * * * *